United States Patent
Stiesdal

(10) Patent No.: US 8,174,160 B2
(45) Date of Patent: May 8, 2012

(54) GROUP OF THREE STATOR WINDINGS FOR A STATOR OF AN ELECTRIC MACHINE, A STATOR ARRANGEMENT, A GENERATOR, AND WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 40 days.

(21) Appl. No.: 12/562,300

(22) Filed: Sep. 18, 2009

(65) Prior Publication Data

US 2010/0066196 A1 Mar. 18, 2010

(30) Foreign Application Priority Data

Sep. 18, 2008 (EP) .................... 08016468

(51) Int. Cl.
*H02K 1/00* (2006.01)
*H02K 3/00* (2006.01)
*H02K 17/00* (2006.01)
*H02K 19/00* (2006.01)
*H02K 21/00* (2006.01)
*H02K 23/26* (2006.01)

(52) U.S. Cl. ........ 310/198; 310/184; 310/201; 310/203; 310/208; 310/260

(58) Field of Classification Search .............. 310/198, 310/201, 260, 203, 208, 184; *H02K 1/00, H02K 3/00, 17/00, 19/00, 21/00, 23/26*
See application file for complete search history.

(56) References Cited

U.S. PATENT DOCUMENTS

| | | | | |
|---|---|---|---|---|
| 4,336,474 A | * | 6/1982 | Davey | 310/179 |
| 4,346,320 A | * | 8/1982 | Davey | 310/179 |
| 5,714,824 A | * | 2/1998 | Couture et al. | 310/208 |
| 5,744,896 A | * | 4/1998 | Kessinger et al. | 310/268 |
| 5,886,444 A | * | 3/1999 | Enomoto et al. | 310/208 |
| 5,982,069 A | * | 11/1999 | Rao | 310/208 |
| 6,229,241 B1 | * | 5/2001 | Ishigami et al. | 310/208 |
| 6,459,189 B1 | * | 10/2002 | Lloyd | 310/216.013 |
| 6,894,418 B2 | * | 5/2005 | Jones et al. | 310/208 |
| 2004/0256942 A1 | | 12/2004 | Yokoyama et al. | |
| 2006/0066167 A1 | * | 3/2006 | Saito et al. | 310/201 |
| 2009/0121576 A1 | * | 5/2009 | Even et al. | 310/208 |
| 2010/0066196 A1 | * | 3/2010 | Stiesdal | 310/198 |

FOREIGN PATENT DOCUMENTS

JP 61185045 A 8/1986
WO WO 2008107513 A1 9/2008

* cited by examiner

*Primary Examiner* — John K Kim

(57) ABSTRACT

A group of three stator windings for a stator of an electric machine, a stator arrangement, a generator, and wind turbine are provided. The first winding head segments of the three stator windings differ in form such that the first winding head segments of at least two of the three stator windings are differently tilted in radial direction of the electric machine and the length of the three stator windings is substantially the same.

24 Claims, 2 Drawing Sheets

GROUP OF THREE STATOR WINDINGS FOR A STATOR OF AN ELECTRIC MACHINE, A STATOR ARRANGEMENT, A GENERATOR, AND WIND TURBINE

CROSS REFERENCE TO RELATED APPLICATIONS

This application claims priority of European Patent Office application No. 08016468.4 EP filed Sep. 18, 2008, which is incorporated by reference herein in its entirety.

FIELD OF INVENTION

The invention relates to a group of three stator windings for a stator of an electric machine. The invention concerns also a stator arrangement comprising such stator windings, a generator—e.g. a direct drive generator for a wind turbine—comprising such a stator as well as a wind turbine comprising such a generator.

BACKGROUND OF INVENTION

In large electrical machines or generators it is common to use a so called double-layer winding. This winding type has the benefit that all coils are identical and the coils are easy to manufacture.

SUMMARY OF INVENTION

However, in electrical machines with a high number of poles and a small pole pitch the traditional double layer windings can be difficult to mount because an insertion of a last coil within dedicated slots require to temporarily lift a first coil out of the slots while completing the winding of the coil, so that the last coil can be inserted underneath the temporarily removed part of the first coil.

Furthermore, for a segmented electrical machine double layer windings require coils that connect across the segment joint.

It is possible to make single-layer windings that do not require the removal of the first inserted coils when inserting the last coils in a stator. It is also possible to make single-layer windings that do not need to cross segment joints. Consequently, single-layer windings can be advantageous for large electrical machines.

Single-layer windings normally require both in-plane and out-of-plane winding overhangs. These winding overhangs are also called end windings or winding heads.

It is possible to make a single layer winding that does not need to cross the segment joint of a segmented stator, but when using known single-layer technology this leads to large winding overhangs taking up a large space at the ends of the stator pack and consuming large amounts of copper for the winding.

It is therefore an object of the present invention to provide a group of stator windings, a stator arrangement, a generator as well as a wind turbine in such a way, that the winding overhangs consume less copper.

The object of the invention is inventively achieved by a group of three stator windings, a stator arrangement, by a generator, and by a wind turbine.

Advantageous embodiments can be found in the dependent claims.

According to the invention a group of three stator windings for a stator of an electric machine—e.g. a generator—is defined, whereas the stator having a first cylindrical surface with a plurality circumferentially spaced winding slots formed in it, each winding slot extending along an axial length of the first cylindrical surface and set up to embed a segment of a single stator winding, each stator winding is pre-formed as a closed loop, two substantially parallel segments of each stator winding set up to be embedded in a first and a second winding slot of the stator, with the second winding slot being the third adjacent winding slot to the first winding slot, each of the three stator windings having a first winding head segment leaving the winding slots in axial direction of the stator, the first winding head segments of the three stator windings differ in form so that the first winding head segments of at least two of the three stator windings are differently tilted in radial direction of the electric machine and the length of the three stator windings is substantially the same.

This is advantageous because all three coils have the same length and therefore having all the same resistance. This is true for the three windings but particularly also for the three coils that each are comprised of a plurality of the same number of windings. This then also results in that the three coils pull the same current.

Advantageously the three windings represent the three phases in an electrical machine with one pole per slot per phase and are arranged of equal angular pitch, and—in terms of the distance between the first and the second winding slot—with a pitch of three winding slot pitches. This means that between the first and the second winding slot of a first winding and between the second winding slot of a first winding to the first winding slot of another winding belonging to the same coil representing one phase, two winding slot gaps are existing that will be filled with two further windings belonging to two further coils for the other two phases.

Besides, advantageously the invention concerns single-layer stator windings so that only one winding will be mounted in one winding slot.

The stator windings may be pre-formed that way that the cross-section of a winding will be substantially rectangular. The cross section of the windings may be the same overall the whole loop of the winding.

The winding heads may be arranged that the windings do not touch each other when mounted into adjacent winding slots.

Further, the invention is in particular advantageous because the overall length of all windings and therefore also the coils may be kept at a minimum length resulting in a reduction of material for the windings, especially copper. Besides, this also results in a reduction of weight, e.g. a couple of hundred kilograms in a large generator for example in a wind turbine.

Additionally the invention allows reducing the axial extent of the winding heads so that the stator including the windings will have a smaller axial dimension. This may reduce the dimension of the housing of the electric machine and also the overall weight of the electric machine.

The above mentioned invention defines a first winding head extending in one axial direction of the stator. Obviously to close the loop also a second winding head is present extending in the other axial direction of the stator. In a preferred embodiment, the second winding head has the same dimension as the first winding head, possibly being reflection symmetric and/or point symmetric to the first winding head.

Besides, each of the three stator windings may itself be reflection symmetric with the axis of symmetry being parallel to the winding slots, including also the first and the second winding head.

An advantageous shape for examples of the winding heads will be explained later with respect to a schematic drawing.

The object of the present invention is also inventively achieved by a stator arrangement comprising the group of windings as described before, by a generator comprising such a stator arrangement and a wind turbine comprising such a generator.

BRIEF DESCRIPTION OF THE DRAWINGS

The invention will in the following be explained in more detail with reference to the schematic drawings, wherein.

DETAILED DESCRIPTION OF INVENTION

Figure 1:
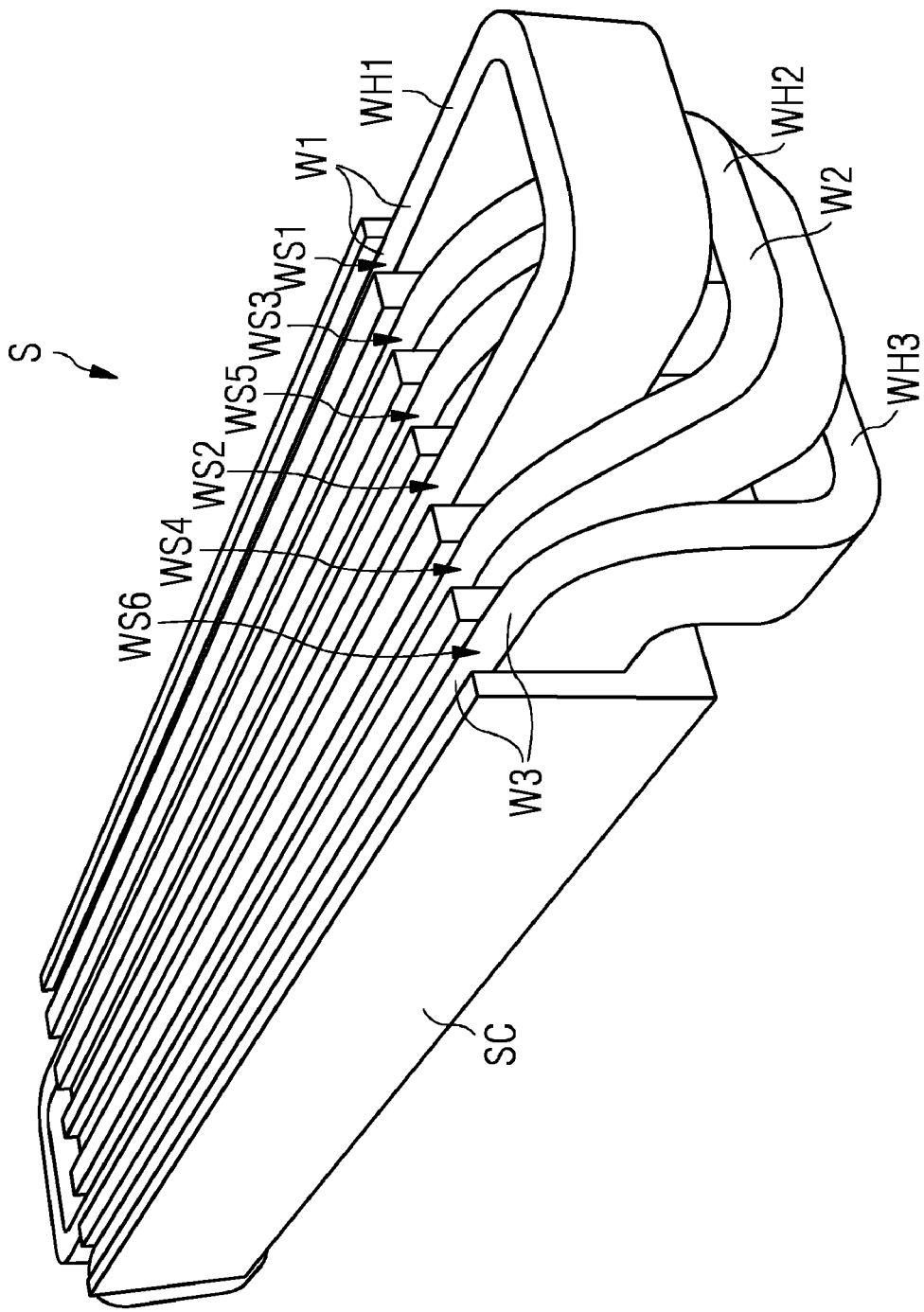
FIG. 1 shows three winding heads of three windings.
Figure 2:
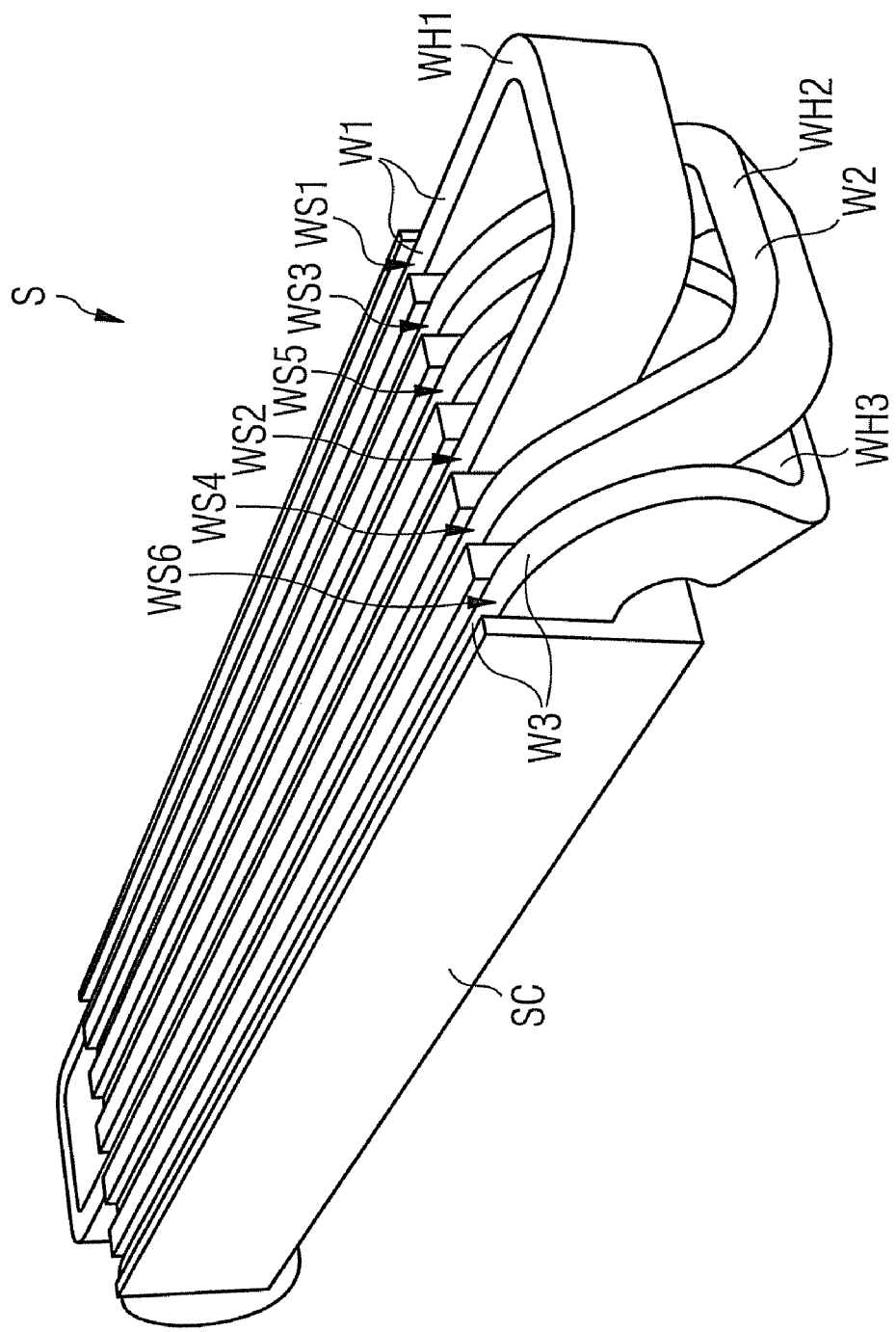
FIG. 2 shows alternative winding heads.

FIG. 1 and FIG. 2 each show a three-dimensional section of a stator S for a large conventional rotating electrical machine—especially a generator for a wind turbine. The complete stator S comprises a stator core SC and a large number of open-type radial winding slots WS1, WS2, . . . that are uniformly spaced around the circumference of the radially inner or outer surface of the stator core SC, depending whether the stator S is an inner or an outer stator of the electrical machine. Due to the large dimension of the stator S, the shown section of the stator S appears in FIG. 1 as a cuboid with substantially parallel winding slots WS1, WS2, . . . , WSx (x being a integer value of 1 to 6). This is acceptable as an approximation but it need to be understood that the adjacent winding slots WS1, WS2, . . . are not completely parallel planes regarding their slots, because the slots all are directed radially to a centre axis of the electrical machine. As a further approximation—or in other situations this might be absolutely true—the slots are cuboid narrow channels with a rectangular cross-section.

It has to be noted that in the example the winding slots are arranged parallel to the longitudinal axis of the stator, but it is also possible to have the winding slots formed at an angle to the longitudinal axis of the stator.

The stator core SC may be laminated, i.e. formed from a plurality of axially stacked laminations.

FIGS. 1 and 2 show furthermore three windings W1, W2, W3 that are pre-formed and have a rectangular cross-section fitting right into the cross-section of the winding slots WS1, WS2, . . .

In FIGS. 1 and 2 a single layer stator winding is shown, so that only a single segment of a single winding W1, W2, W3 is placed into a single winding slot WS1, WS2, . . . —instead of placing a segment of a first winding and a segment of a second winding into single winding slot being substantially on top of each other in the slot, as it is done for double-layer winding.

Furthermore the windings W1, W2, W3 each have two segments that get inserted into two winding slots—e.g. winding W1 will be inserted with one segment of the winding loop into the first winding slot WS1 and with another segment of the winding loop into the second winding slot WS2. The windings W1, W2, W3 are closed loops therefore requiring a section to close the loops between the substantially parallel sections of the windings inside the winding slots. This is done via winding heads WH1, WH2, WH3 that extend outside of the stator S and close the loop at both axial ends of the stator S.

The winding slots build pairs of slots to mount a single winding. In the figures the winding slots WS1 and WS2 build a pair of slots for the first winding W1, the winding slots WS3 and WS4 build a pair of slots for the second winding W2, and the winding slots WS5 and WS6 build a pair of slots for the third winding W3.

It is assumed that each of the windings is symmetric—axial symmetric to a radial plane in the centre of the stator S-, so in the following usually only one winding head of the windings is observed, but all that is said is also applicable to the winding heads at the other end of the stator.

Furthermore it is assumed that the length of all windings is identical. The only difference between the first winding W1, second winding W2, and third winding W3 is the three-dimensional shape of their winding heads WH1, WH2, WH3.

Regarding the winding W1 it is assumed that it is substantially formed that way that the winding head WH1 stay in an area between the radial plane of the winding slot WS1 and the radial plane of the winding slot WS2, so that the winding W1 does not touch or interfere adjacent windings. The winding head WH1 may extend in radial direction between these radial planes, but it is assumed only the space in one radial direction should be used so to not interfere with the rotor, which is not shown in the figures. Taking the circumferential surface of the stator core SC as the reference plane, for an inner stator the space from that reference plane facing the axis of the stator could be consumed for the winding head WH1. For an outer stator the space from that reference plane facing the radial outside of the electrical machine until the housing of the electrical machine could be consumed for the winding head WH1.

The above said regarding winding W1 and winding head WH1 applies accordingly also for the winding W2 and W3 with their winding heads WH2 and WH3.

The windings W1, W2, and W3 furthermore are preferably formed that way that they can easily be mounted by following a specific order of mounting the windings into the stator winding slots. Specifically the windings should not to be tangled up so that all three windings need to be mounted in one step. Preferably the windings should be formed like this that as a first option all windings W3 could be inserted overall the stator, followed by winding W2 and finally by winding W1. As a second option the stator could be mounted with the windings W1, W2, W3 winding by winding, putting in first a single W3, then single W2, followed by a single W1, and starting all over again with W3.

In the following description, if the terms "underneath" or "above" or similar directional terms are used, this belongs to the orientation as it is shown in the figures. "Above" means in the direction from where the windings get mounted. For an inner stator this means the direction away from the centre axis of the stator. With "underneath" the opposite direction is meant.

In the following specifically focusing on FIG. 1, the first winding head WH1 extends in the plane of the two substantially parallel segments of the stator winding W1. The winding loop stays in one plane and is flat and not tilted out of the plane. In other words, once mounted, winding W1 including its winding head WH1 stays in the same plane as the plane of the winding slots WS1 and WS2 of the stator S.

The length of the section of the winding head WH1 that longitudinally extends the winding segments within the winding slots WS1, WS2 is set up that way, that the winding length of winding W1 has substantially the same length as the length each of the other two windings W2, W3.

Proceeding to winding W2, the winding head WH2 is tilted at one pivotal point and then extend in a plane different from the plane of the two substantially parallel segments of the stator winding W2. The pivotal point is in the area of the winding head WH2 and close to the substantially parallel segments of the stator winding W2. Therefore the winding W2 is tilted close to the stator block. The winding head WH2, after the turn at the pivotal point extends then underneath the winding head WH1, so that the loop of the winding W2 can be closed underneath the winding W1 and above the winding W3.

The winding W2 might perform a "sharp turn" at the pivotal point but preferably might also perform a continuous change of direction over a specific section around the pivotal point.

The change of direction at the pivotal point might preferably be 45 degrees, measured from the plane of the two substantially parallel segments. Also different angles could be beneficial, starting from close to 0 degree and ending with a value close to 90 degree.

Now regarding the winding W3, its winding head WH3 comprises a section that is continuously tilted on a curvature, whereas the curvature is a 90 degree segment of a substantially circular arc. In the figure, after the 90 degree turn has reached, the winding W3 then further extends in a plane that is perpendicular to the plane of the substantially parallel winding segments.

The winding head WH3 after the perpendicular extension extends then underneath the winding head WH2.

Not mentioned so far, all three windings W1, W2, W3 close their loops between the radial planes of their winding slots with a connection section perpendicular to these mentioned radial planes. The transition from the winding head sections located in the radial planes to/from the connection section is performed via a 90 degree turn with a fairly small radius. The connection itself is then substantially plain and straight.

Due to the fact that the cross-section of each winding W1, W2, W3 is substantially rectangular, the connection section itself is substantially cuboid and therefore located in a plane of the cuboid. Regarding winding W1, this plane of the connection section of winding head WH1 is parallel to the side surface of the cylindric stator core SC. Regarding winding W2, the plane of the connection section of winding head WH2 is substantially in a 45 degree angle in relation to the side surface of the cylindric stator core SC. Regarding winding W3, the plane of the connection section of winding head WH3 is substantially in a 90 degree angle in relation to the side surface of the cylindric stator core SC or, in other words, parallel to the plane of the stator winding slots.

More general than shown in FIG. 1 and than mentioned before, the planes of the connections of each of the three stator windings W1, W2, W3 are arranged out of alignment, particularly not in parallel.

Specifically in FIG. 1, the connection sections of the three winding heads WH1, WH2, and WH3 can be seen as arranged on a surface of a virtual cylinder with the cylinder axis roughly being located at side surface of the cylindric stator core SC in the height of the plane of the winding slots.

The winding W1, which is not tilted at all, can be viewed as a substantially rectangular belt. The windings W2 and W3 can also be seen as such rectangular belt, only with the modifications that close to the corner the longer side of the rectangular is bent.

Proceeding to FIG. 2, the most that was said before is still applicable. Especially the features explained for the windings W1 and W2 still apply, because both windings W1, W2 as seen in FIG. 2 are identical to the windings W1 and W2 of FIG. 1.

Winding W3 of FIG. 2 differs from the winding W3 of FIG. 1, that the section that is continuously tilted on a curvature of the winding head WH3 has a curvature that is more than a 90 degree segment of a substantially circular arc. Specifically in FIG. 2 the angle, taken from the plane of the stator winding slots is about 135 degrees, considering the angle of winding head WH2 is about 45 degrees. This allows a very compact arrangement, because the plane of the connection of winding head WH3 is parallel to the direction of a section of the winding head WH2 and the underneath surface of the winding W2. Therefore the winding head WH2 and the winding head WH3 can be arranged very close to each other which again allows to reduce the overall expansion in space of the winding heads.

Both embodiments have the advantage that the length of each winding can be reduced and that the length of the three windings is identical. This allows a vast reduction of material for the windings and a major reduction of weight.

It has to be understood that slight variations of the embodiments of FIG. 1 and FIG. 2, especially regarding the perfectness of the circular arc, regarding the perfect planarity of the mentioned planes, or regarding specifically mentioned angles, are also covered by this invention.

The invention claimed is:

1. A group of three stator windings for a stator of an electric machine, wherein
   the stator comprises a first cylindrical surface with a plurality circumferentially spaced winding slots, each winding slot extending along an axial length of the first cylindrical surface and formed to embed a segment of a single stator winding,
   each stator winding pre-formed as a closed loop, two substantially parallel segments of each stator winding formed to be embedded in a first and a second winding slot of the stator, with the second winding slot being the third adjacent winding slot to the first winding slot,
   each of the three stator windings comprising a first winding head segment extending from the winding slots in an axial direction of the stator, and a second winding head segment extending from the winding slots in opposite axial direction of the stator than the first winding head segment,
   the first winding head segments of the three stator windings differing in form so that the first winding head segments of at least two of the three stator windings are differently tilted in a radial direction of the electric machine, and
   a length of the closed-loop of each one of the three stator windings substantially the same and each stator winding lacking twists along the length of the closed-loop,
   wherein the first winding head segment of a first of the three stator windings is identical in form to the second winding head segment of a second of the three stator windings.

2. A group of three stator windings according to claim 1, wherein each of the three stator windings comprises a second winding head segment extending from the winding slots in opposite axial direction of the stator than the first winding head segment, and
   wherein the second winding head segments of the three stator windings differing in form so that the second winding head segments of at least two of the three stator windings are differently tilted in radial direction of the electric machine.

3. A group of three stator windings according to claim 1, wherein the electric machine is a generator.

4. A group of three stator windings according to claim 1, wherein the group of the three stator windings and the stator comprise one slot per pole per phase for a three-phase electric machine.

5. A group of three stator windings according to claim 1, wherein each of the three stator windings are itself reflection symmetric with the axis of symmetry being parallel to the winding slots.

6. A group of three stator windings according to claim 1, wherein the first and the second winding head segments are reflection symmetric and/or point symmetric to each other.

7. A group of three stator windings according to claim 1, wherein the first and/or the second winding head segments of one of the three stator windings extend in the plane of the two substantially parallel segments of each stator winding.

8. A group of three stator windings according to claim 1, wherein the first and/or the second winding head segments of one of the three stator windings are tilted at one pivotal point and then extend in a plane different from the plane of the two substantially parallel segments of each stator winding.

9. A group of three stator windings according to claim 1, wherein the first and/or the second winding head segments of one of the three stator windings comprising a section that is continuously tilted on a curvature.

10. A group of three stator windings according to claim 9, wherein the curvature is a 90 degree segment of a substantially circular arc.

11. A group of three stator windings according to claim 9, wherein the curvature is more than a 90 degree segment of a substantially circular arc.

12. A group of three stator windings according to claim 1, wherein the first and/or the second winding head segments having a substantially straight connection between a curvature section within the plane of the first winding slot of the stator and a curvature section within the plane of the second winding slot of the stator, the connection being arranged in a plane substantially perpendicular to the planes of the first and second winding slots.

13. A group of three stator windings according to claim 12, wherein the planes of the connections of each of the three stator windings being out of parallel alignment.

14. A stator arrangement, comprising:
a plurality of groups of three stator windings as claimed in claim 1; and
a stator which comprises a first cylindrical surface with a plurality circumferentially spaced winding slots, each winding slot extending along an axial length of the first cylindrical surface and formed to embed a segment of a single stator winding.

15. A group of three stator windings for a stator of an electric machine, wherein
the stator comprises a first cylindrical surface with a plurality circumferentially spaced winding slots, each winding slot extending along an axial length of the first cylindrical surface and formed to embed a segment of a single stator winding,
each stator winding pre-formed as a closed loop, two substantially parallel segments of each stator winding formed to be embedded in a first and a second winding slot of the stator, with the second winding slot being the third adjacent winding slot to the first winding slot,
each of the three stator windings comprising a first winding head segment extending from the winding slots in an axial direction of the stator, and a second winding head segment extending from the winding slots in opposite axial direction of the stator than the first winding head segment,
the first winding head segments of the three stator windings differing in form so that the first winding head segments of at least two of the three stator windings are differently tilted in a radial direction of the electric machine, and
a length of the closed-loop of each one of the three stator windings substantially the same and each stator winding lacking twists along the length of the closed-loop,
wherein the first and/or the second winding head segments of one of the three stator windings comprising a section that is continuously tilted on a curvature wherein the curvature is more than a 90 degree segment of a substantially circular arc.

16. A group of three stator windings according to claim 15, wherein the first winding head segment of a first of the three stator windings is identical in form to the second winding head segment of a second of the three stator windings.

17. A group of three stator windings according to claim 15, wherein each of the three stator windings comprises a second winding head segment extending from the winding slots in opposite axial direction of the stator than the first winding head segment, and
wherein the second winding head segments of the three stator windings differing in form so that the second winding head segments of at least two of the three stator windings are differently tilted in radial direction of the electric machine.

18. A group of three stator windings according to claim 15, wherein the group of the three stator windings and the stator comprise one slot per pole per phase for a three-phase electric machine.

19. A group of three stator windings according to claim 15, wherein each of the three stator windings are itself reflection symmetric with the axis of symmetry being parallel to the winding slots.

20. A group of three stator windings according to claim 15, wherein the first and the second winding head segments are reflection symmetric and/or point symmetric to each other.

21. A group of three stator windings according to claim 15, wherein the first and/or the second winding head segments of one of the three stator windings extend in the plane of the two substantially parallel segments of each stator winding.

22. A group of three stator windings according to claim 15, wherein the first and/or the second winding head segments of one of the three stator windings are tilted at one pivotal point and then extend in a plane different from the plane of the two substantially parallel segments of each stator winding.

23. A group of three stator windings according to claim 15, wherein the first and/or the second winding head segments having a substantially straight connection between a curvature section within the plane of the first winding slot of the stator and a curvature section within the plane of the second winding slot of the stator, the connection being arranged in a plane substantially perpendicular to the planes of the first and second winding slots.

24. A group of three stator windings according to claim 23, wherein the planes of the connections of each of the three stator windings being out of parallel alignment.

* * * * *